United States Patent
Ohtani et al.

(10) Patent No.: US 7,579,115 B2
(45) Date of Patent: Aug. 25, 2009

(54) GELLING AGENT FOR ALKALINE BATTERY AND ALKALINE BATTERY

(75) Inventors: Kazuya Ohtani, Kyoto (JP); Takeaki Yamaguchi, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 112 days.

(21) Appl. No.: 11/631,651

(22) PCT Filed: Jul. 6, 2005

(86) PCT No.: PCT/JP2005/012503

§ 371 (c)(1),
(2), (4) Date: Jan. 5, 2007

(87) PCT Pub. No.: WO2006/006471

PCT Pub. Date: Jan. 19, 2006

(65) Prior Publication Data

US 2007/0231703 A1    Oct. 4, 2007

(30) Foreign Application Priority Data

Jul. 8, 2004    (JP)    ............................ 2004-201441

(51) Int. Cl.
*H01M 6/14*    (2006.01)
*H01M 10/26*    (2006.01)

(52) U.S. Cl. ........................ 429/300; 429/188; 429/189; 429/206

(58) Field of Classification Search ........................ None
See application file for complete search history.

(56) References Cited

U.S. PATENT DOCUMENTS 5,587,254 A    12/1996    Kojima et al.
6,265,105 B1    7/2001    Tokuda et al.
6,667,133 B1    12/2003    Sumiya et al.

FOREIGN PATENT DOCUMENTS

EP    0 414 990    3/1991

(Continued)

*Primary Examiner*—Patrick Ryan
*Assistant Examiner*—Angela J. Martin
(74) *Attorney, Agent, or Firm*—Hamre, Schumann, Mueller & Larson, P.C.

(57) ABSTRACT

A gelling agent for use in an alkaline battery comprises a cross-linked polymer (A) formed with a (meth)acrylic acid (salt) as a principal constituent monomer unit, wherein the gelling agent allows an obtained gel (GA) to have a viscosity ratio (N1/N60), determined as follows, of 0.7 to 1.3, and includes components soluble in 37 wt % aqueous solution of potassium hydroxide that account for 30 wt % or less of the gelling agent: the viscosity ratio (N1/N60) of the gel (GA) is determined by preparing the gel (GA) by stirring 100 parts by weight of 37 wt % aqueous solution of potassium hydroxide, 2 parts by weight of the cross-linked polymer (A), and 200 parts by weight of zinc powder at 40° C. so as to be mixed uniformly, and measuring a viscosity (40° C., N1) of the gel (GA) after being left to stand at the same temperature for one day, and a viscosity (40° C., N60) of the gel (GA) after being left to stand at the same temperature for sixty days, according to JIS K7117-1: 1999. The foregoing gelling agent and an alkaline battery using the gelling agent exhibit excellent impact resistance and excellent long-term retention of discharge characteristics.

11 Claims, 1 Drawing Sheet

FOREIGN PATENT DOCUMENTS

| | | |
|---|---|---|
| EP | 1 427 040 | 6/2004 |
| JP | 2-119053 | 5/1990 |
| JP | 2-267863 | 11/1990 |
| JP | 3-89458 | 4/1991 |
| JP | 5-135770 | 6/1993 |
| JP | 6-260171 | 9/1994 |
| JP | 6-349484 | 12/1994 |
| JP | 7-65818 | 3/1995 |
| JP | 7-296804 | 11/1995 |
| JP | 8-12775 | 1/1996 |
| JP | 8-28216 | 1/1996 |
| JP | 10-50303 | 2/1998 |
| JP | 2000-67910 | 3/2000 |
| JP | 2000-306589 | * 11/2000 |
| JP | 3323468 | 6/2002 |

* cited by examiner

GELLING AGENT FOR ALKALINE BATTERY AND ALKALINE BATTERY

TECHNICAL FIELD

The present invention relates to a gelling agent for an alkaline battery, and an alkaline battery. More specifically, the present invention relates to a gelling agent for use in an alkaline battery having a gel-form negative electrode, which is to be used as a gelling agent for an alkaline battery negative electrode that principally contains an alkaline electrolytic solution and zinc powder. Further, the present invention also relates to an alkaline battery in which the foregoing gelling agent is used.

BACKGROUND ART

Conventionally, for a cathode of an alkaline battery, a mixture of a high-concentration alkaline electrolytic solution (a high-concentration aqueous solution of potassium hydroxide, which may contain zinc oxide or the like as required) and zinc powder and/or zinc alloy powder, etc., has been used principally, and in order to prevent sedimentation of the zinc powder or the like in the alkaline electrolytic solution, it has been proposed, for example, to use therein, as a gelling agent, a water-absorbing resin obtained by insolubilizing a poly(meth)acrylic acid and a salt of the same with use of a crosslinking agent (Patent documents 1 to 3). Further, from the viewpoint of the prevention of sedimentation of a zinc powder, the prevention of leakage from a battery, and the improvement of productivity of a battery, it has been proposed to use a gelling agent whose particle diameter is relatively large and an alkaline electrolytic solution having a reduced spinnability (Patent document 4).

[Patent document 1] JP 8(1996)-28216B
[Patent document 2] JP 8(1996)-12775B
[Patent document 3] JP 10(1998)-50303A
[Patent document 4] Japanese Patent No. 3323468

DISCLOSURE OF THE INVENTION

Problem to be Solved by the Invention

Such alkaline batteries in which gelling agents of water-absorbing resins are used, however, did not necessarily satisfy the required levels of the most important characteristics of the alkaline batteries, that is, long-term retention of discharge characteristics (discharge amount and discharge time) and impact resistance.

It is an object of the present invention to provide a gelling agent for an alkaline battery that excels in long-term retention of the discharge characteristics (discharge amount and discharge time) and impact resistance, and to provide an alkaline battery in which the foregoing gelling agent is used.

Means for Solving Problem

The gelling agent of the present invention for use in an alkaline battery comprises a cross-linked polymer (A) formed with a (meth)acrylic acid (salt) as a principal constituent monomer unit, wherein the gelling agent allows an obtained gel (GA) to have a viscosity ratio (N1/N60), determined as follows, of 0.7 to 1.3, and includes components soluble in 37 percent by weight (wt %) aqueous solution of potassium hydroxide that account for 30 wt % or less of the gelling agent: the viscosity ratio (N1/N60) of the gel (GA) is determined by preparing the gel (GA) by stirring 100 parts by weight of 37 wt % aqueous solution of potassium hydroxide, 2 parts by weight of the cross-linked polymer (A), and 200 parts by weight of zinc powder at 40° C. so as to be mixed uniformly, and measuring a viscosity (40° C., N1) of the gel (GA) after being left to stand at the same temperature for one day, and a viscosity (40° C., N60) of the gel (GA) after being left to stand at the same temperature for sixty days, according to JIS K7117-1: 1999.

Further, an alkaline battery of the present invention is an alkaline battery containing the above-described gelling agent for use in an alkaline battery, and zinc powder.

Effects of the Invention

The gelling agent of the present invention and the alkaline battery using the gelling agent achieve the following effects.

(i) In the case where the gelling agent is used in an alkaline battery, a battery can be produced that exhibits extremely excellent long-term retention of discharge and impact resistance.

(ii) Since an alkaline electrolytic solution in which the gelling agent of the present invention is added has good drainability (is not very sticky), the alkaline electrolytic solution is suitable for the high-speed filling required for the recent high-speed battery production.

(iii) Because of smaller variations in the filled amount of the electrolytic solution per one battery upon filling the electrolytic solution, batteries of uniform quality can be produced even in mass production.

(iv) Since substantially no hydrogen gas is generated even when the gelling agent is in contact with zinc powder in an alkaline electrolytic solution, there is no possibility that leakage of electrolytic solution or breakage of a battery because of increased pressure in the battery would occur.

(v) The present invention allows a negative electrode gel to be filled uniformly at a high speed even in a small-size battery, thereby making it possible to produce batteries of uniform quality.

Figure 1:
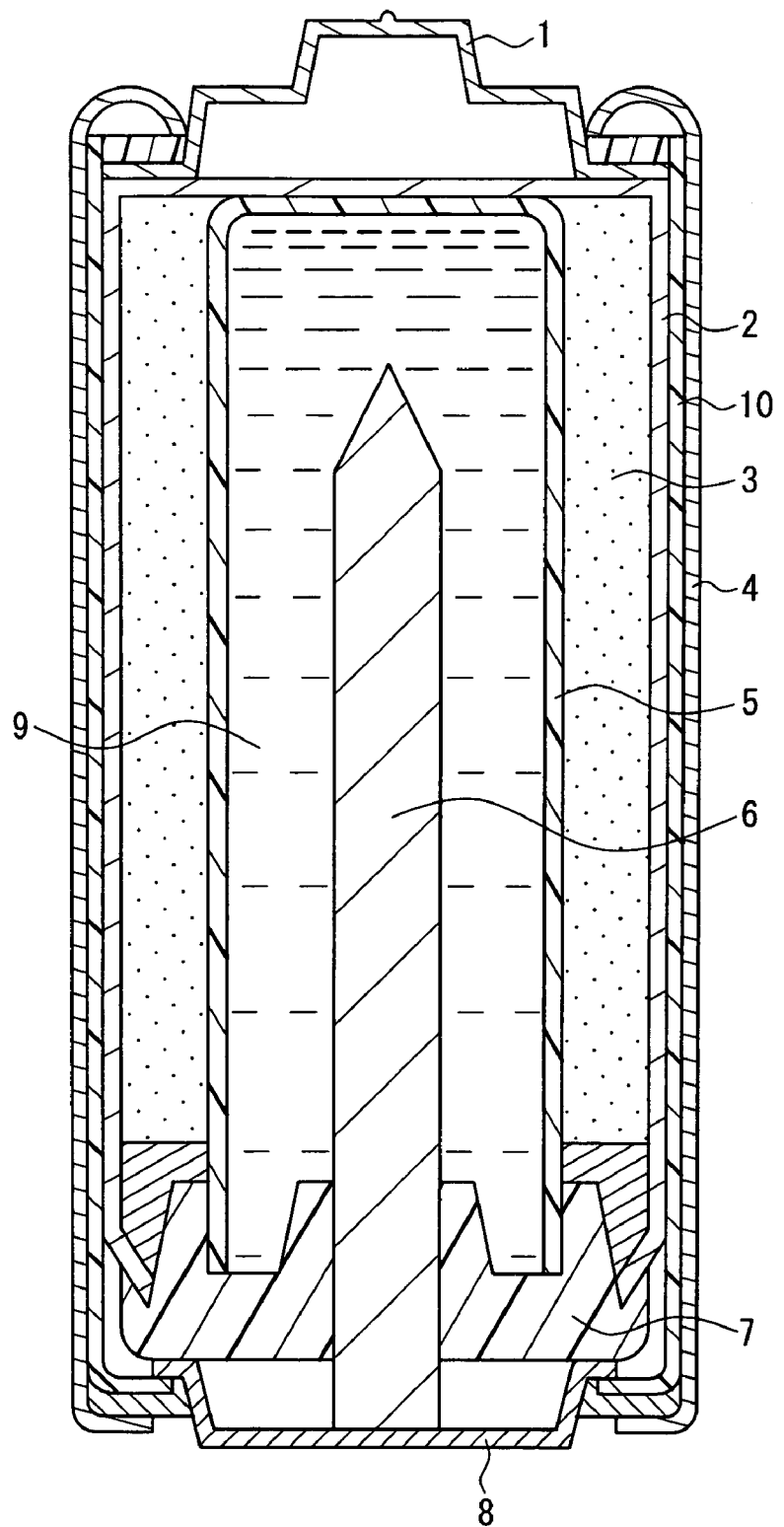
FIG. 1 is a cross-sectional view illustrating an exemplary alkaline battery of the present invention.

BRIEF DESCRIPTION OF REFERENCE NUMERALS 1. positive electrode terminal plate
2. shrinkable tube
3. positive electrode agent
4. outer can
5. separator
6. charge collector rod
7. gasket
8. negative electrode terminal plate
9. gel negative electrode

DETAILED DESCRIPTION OF THE INVENTION

The gelling agent of the present invention comprises a cross-linked polymer (A) formed with a (meth)acrylic acid (salt) as a principal constituent monomer unit, and the gelling agent allows an obtained gel (GA) to have a viscosity ratio (N1/N60) of 0.7 to 1.3, and includes components soluble in 37 wt % aqueous solution of potassium hydroxide that account for 30 wt % or less of the gelling agent.

Here, the viscosity ratio (N1/N60) of the gel (GA) is derived by a formula shown below, from values determined by preparing the gel (GA) by stirring 100 parts by weight of 37 wt % aqueous solution of potassium hydroxide, 2 parts by weight of the cross-linked polymer (A), and 200 parts by weight of zinc powder at 40° C. so as to be mixed uniformly, measuring a viscosity (40° C., N1) of the gel (GA) after being left to stand at the same temperature for one day, and a viscosity (40° C., N60) of the gel (GA) after being left to stand at the same temperature for sixty days, according to JIS K7117-1: 1999 [corresponding to ISO 2555: 1990]:

Viscosity ratio $(N1/N60)=(40°\ C., N1)/(40°\ C., N60)$

The viscosity ratio (N1/N60) normally is 0.7 to 1.3, preferably 0.8 to 1.2, and further preferably 0.9 to 1.1. The viscosity ratio in the foregoing range further hinders the sedimentation of the zinc powder in the electrolytic solution, thereby further improving the discharge characteristics and impact resistance. Still further, in the case where the amount of soluble components of the gelling agent are 30 wt % or less, an increase in the spinnability of an alkaline aqueous solution and a decrease in the viscosity thereof over a long term can be prevented.

In the gelling agent of the present invention, among swollen particles (BA) obtained by uniformly mixing 2 parts by weight of the cross-linked polymer (A) and 300 parts by weight of an aqueous solution of potassium hydroxide having a concentration of 37 wt % at 25° C., swollen particles having particle diameters of 32 to 1,000 μm preferably account for at least 80 wt % based on an entire weight of the swollen particles (BA). This is because the impact resistance is improved further.

Regarding the gelling agent of the present invention, an absorption amount of the cross-linked polymer (A) determined by the tea bag method after one-hour immersion in an aqueous solution of potassium hydroxide having a concentration of 37 wt % is preferably 20 to 60 g/g, more preferably 23 to 50 g/g, and particularly preferably 25 to 40 g/g. In the case where the foregoing absorption amount is in this range, the discharge characteristics of a battery can be improved, and upon high-speed injection of an alkaline electrolytic solution containing the gelling agent into batteries, variations in the injected amount of the electrolytic solution per battery can be reduced.

Regarding the gelling agent of the present invention, the viscosity (40° C., N1) of the gel (GA) preferably is 30 to 300 Pa·s, more preferably 40 to 300 Pa·s, particularly preferably 50 to 200 Pa·s, and most preferably 60 to 100 Pa·s In the case where the foregoing viscosity is not less than 30, the discharge characteristics of a battery obtained can be improved further. In the case where the foregoing viscosity is not more than 300, the properties of the electrolytic solution suitable for the high-speed filling into batteries can be improved.

Regarding the gelling agent of the present invention, the content of a metal element having an ionization tendency lower than that of zinc preferably is not more than $15 \times 10^{-4}$ wt %, more preferably not more than $12 \times 10^{-4}$ wt %, and particularly preferably not more than $10 \times 10^{-4}$ wt %. In the case where the foregoing content is in this range, though depending on the structure and capacitance of a battery used and an amount of the gelling agent to be added in the battery, the following problems can be prevented: batteries being formed between zinc powder in the battery and metal ions contaminating the same, and hydrogen gas being generated by electrolysis to increase the pressure in the battery and causes leakage of the alkaline electrolytic solution, breakage of the battery, and the like. Therefore, the foregoing content in the foregoing range is preferred.

As a gelling agent of the present invention for use in an alkaline battery, a gelling agent as follows is preferred, too: a gelling agent that swells with water, and comprises a cross-linked polymer (A) formed with a (meth)acrylic acid (salt) as a principal constituent monomer unit, wherein the gelling agent is obtained by aqueous solution polymerization or reversed-phase suspension polymerization in which a cross-linking agent (b) that is decomposable in an alkaline environment and an allyl ether-type cross-linking agent (c) having 2 to 10 allyl groups are used in combination, wherein each amount of the cross-linking agents (b) and (c) is in a range of 0.05 to 3% on the basis of a weight of the (meth)acrylic acid (salt), and the gelling agent satisfies the following requirements (1) and (2):

Requirement (1): when the gelling agent swells in an aqueous solution of potassium hydroxide having a concentration of 37 wt %, swollen particles having particle diameters of 32 to 1,000 μm account for 80 wt % or more; and Requirement (2): an absorption amount determined by the tea bag method after one-hour immersion in an aqueous solution of potassium hydroxide having a concentration of 37 wt % is 20 to 60 g/g.

The requirement (1) is a requirement for providing improvement of impact resistance and smooth injection of the gelling agent into a battery. The requirement (2) is a requirement for providing improvement of discharge characteristics of a battery and, upon high-speed injection of an alkaline electrolytic solution containing the gelling agent into a battery, reducing variations in the injected amount of the electrolytic solution per battery.

The cross-linked polymer (A) is obtained by polymerization of a material principally containing a (meth)acrylic acid (salt) in the presence of a cross-linking agent.

In the present invention, "a (meth)acrylic acid" refers to "an acrylic acid and/or a methacrylic acid", and "a . . . acid (salt)" refers to "a . . . acid" and/or "a . . . acid salt". Examples of the salt include salts of alkali metals such as potassium, sodium, and lithium, and salts of alkaline-earth metals such as calcium. They are converted to salts by neutralizing acrylic acids or methacrylic acids.

Since the gelling agent of the present invention is used in a high-concentration alkaline aqueous solution, the (meth) acrylic acid (salt) unit contained in the cross-linked polymer (A) may be a non-neutralized body {(meth)acrylic acid unit} or a neutralized body {(meth)acrylic acid salt unit}. Preferred is, however, a (meth)acrylic acid salt unit obtained by neutralizing a part of, or an entirety of, a (meth)acrylic acid unit, in order to reduce the viscosity of the cross-linked polymer (A), improve the dispersibility of the same, and improve the workability in the process of production of the cross-linked polymer (A).

When a (meth)acrylic acid unit is neutralized as required, usually a hydroxide of an alkali metal such as potassium hydroxide, sodium hydroxide, or lithium hydroxide, a hydroxide of an alkaline-earth metal such as calcium hydroxide, or an aqueous solution of the same may be added to the (meth)acrylic acid unit in a monomer state before polymerization, or a hydrogel obtained after polymerization. However, a cross-linking agent (c) that is not hydrolytically decomposable in an alkaline environment, which will be described later, has less water-solubility. Therefore, in the case of polymerization in a state in which the degree of neutralization of the (meth)acrylic acid is high, even the addition of a predetermined amount of the cross-linking agent (c) does not cause desired cross-linking, since the cross-linking agent (c) separates from a monomer aqueous solution. As a result, a cross-linked polymer (A) having the specific properties is not obtained in some cases. In such a case, it is more preferable that, with the degree of neutralization of the (meth)

acrylic acid being set in a range of 0 to 30 mole percent (mol %), the polymerization is performed in a state in which the cross-linking agent (c) is contained, and thereafter a hydroxide of an alkaline metal or the like is added to the obtained hydrogel as required so that the degree of neutralization is adjusted.

The final degree of neutralization of the (meth)acrylic acid (salt) of the cross-linked polymer (A) of the present invention {a content (mol %) of the (meth)acrylic acid salt unit on the basis of the total number of moles of the (meth)acrylic acid unit and the (meth)acrylic acid salt unit} is preferably 30 to 100, more preferably 40 to 90, particularly preferably 50 to 90. In the case where the foregoing degree is in this range, the impact resistance and the discharge characteristics of the alkaline electrolytic solution are improved further.

The cross-linked polymer (A) can be obtained by polymerizing and cross-linking a monomer principally containing a (meth)acrylic acid (salt), but the foregoing monomer may be co-polymerized with another monomer copolymerizable with the foregoing monomer as required. The another monoethylenically unsaturated monomer is not particularly limited as long as it is copolymerizable, but preferably it is water-soluble, and more preferably water-soluble ethylenically unsaturated monomer.

Examples of the water-soluble ethylenically unsaturated monomer include:

carboxylic acid (salt) monomers such as maleic acid (salt), fumaric acid (salt), and itaconic acid (salt);

sulfonic acid (salt) monomers such as 2-acrylamide-2-methylpropane sulfonic acid (salt), sulfoalkyl (meth)acrylate, and 4-vinylbenzene sulfonic acid (salt);

amide monomers such as (meth)acrylamide, N-alkyl (having 1 to 3 carbon atoms)-substituted (meth)acrylamide [N-methyl acrylamide, N,N-dimethyl acrylamide, etc.] and N-vinyl acetamide;

alcohol monomers such as monohydroxyalkyl (having 1 to 3 carbon atoms) mono(meth)acrylate;

ether monomers such as polyethylene glycol (polymerization degree: 2 to 100) mono(meth)acrylate, polypropylene glycol (polymerization degree: 2 to 100) mono(meth)acrylate, and methoxypolyethylene glycol (polymerization degree: 2 to 100) mono(meth)acrylate; and ester monomers such as alkyl (having 1 to 5 carbon atoms) (meth)acrylate and vinyl acetate. Two or more of these ethylenically unsaturated monomers may be used in combination.

The content (wt %) of the ethylenically unsaturated monomer unit other than the foregoing (meth)acrylic acid (salt) on the basis of the weight of the cross-linked polymer (A) preferably is 0 to 50 wt %, more preferably 0 to 40 wt %, and particularly preferably 0 to 30 wt %. In the case where the content is in this range, the alkaline electrolytic solution, when used as a gelling agent, exhibits excellent stability over time of its viscosity. Therefore, an alkaline battery obtained has excellent impact resistance and discharge characteristics.

Usually the cross-linked polymer (A) is cross-linked with use of a cross-linking agent. The cross-linking agent is not particularly limited as long as it is a cross-linking agent usually used in the production of polymers, but the cross-linking agent (b) that can be decomposed by hydrolysis in an alkaline environment or the cross-linking agent (c) that is not decomposed by hydrolysis in an alkaline environment is used preferably. Further preferred is a cross-linking agent that contains both of the cross-linking agent (b) and the cross-linking agent (c).

By using the cross-linking agent (b) and the cross-linking agent (c) in combination, the stability of viscosity of the gelling agent is improved further, whereby the syneresis of the alkaline electrolytic solution can be prevented. This allows for long-term retention of discharge. Further, this is preferable since it allows for uniform injection of the alkaline electrolytic solution upon filling it into a battery, thereby reducing variations in the injected amount of the electrolytic solution per battery. It should be noted that the syneresis of the alkaline electrolytic solution refers to a phenomenon of separation between a gelling agent and an alkaline electrolytic solution because of the loss of a substantially uniformly mixed state of the gelling agent and the alkaline electrolytic solution.

The cross-linking agent (b) unit may have a bond that can be decomposed by hydrolysis (this bond is hereinafter referred to as hydrolytically decomposable bond). The hydrolytically decomposable bond may be a bond originally present in a molecule of the cross-linking agent (b), or alternatively, a bond that is to be generated by a cross-linking reaction between the cross-linking agent (b) and the monomer constituting the cross-linked polymer (A) and is to be decomposed by hydrolysis. Preferably the cross-linking agent (b) has a property such that 50 wt % or more is decomposed when a gelling agent is added to the aqueous solution of potassium hydroxide at a ratio of 1 wt % to a 37 wt % aqueous solution of potassium hydroxide at room temperature and is stirred for one hour.

Examples of the hydrolytically decomposable bond include ester bonds and amide bonds.

An exemplary cross-linking agent (b) that has a hydrolytically decomposable bond in its molecule is a copolymerizable cross-linking agent (b1) having 2 to 10 ethylenically unsaturated bonds in one molecule. Examples of the cross-linking agent (b1) include N,N'-methylene bisacrylamide, ethylene glycol di(meth)acrylate, trimethylol propane di(meth)acrylate, trimethylol propane tri(meth)acrylate, pentaerythritol di(meth)acrylate, pentaerythritol tri(meth)acrylate, pentaerythritol tetra(meth)acrylate, and polyglycerol (polymerization degree: 3 to 13) polyacrylate.

Among the examples of the cross-linking agents (b1), preferred are N,N'-methylene bisacrylamide, ethylene glycol di(meth)acrylate, trimethylol propane tri(meth)acrylate, and pentaerythritol tri(meth)acrylate. More preferred are N,N'-methylene bisacrylamide, ethylene glycol di(meth)acrylate, and trimethylol propane tri(meth)acrylate. Particularly preferred are N,N'-methylene bisacrylamide, and trimethylol propane tri(meth)acrylate.

An exemplary cross-linking agent (b) coming to have a hydrolytically decomposable bond as a result of a cross-linking reaction is a reactive cross-linking agent (b2) that is reactive with a carboxylic acid. Examples of the same include polyhydric glycidyl compounds (ethylene glycol diglycidyl ether, etc.), polyvalent isocyanate compounds (4,4'-diphenyl methane diisocyanate, etc.), polyvalent amine compounds (ethylene diamine, etc.), and polyhydric alcohol compounds (glycerol, etc.). The reactive cross-linking agent (b2) is capable of reacting with a (meth)acrylic acid (salt), thereby forming an ester bond or an amide bond.

Among the exemplary cross-linking agents (b), the copolymerizable cross-linking agents (b1) and polyhydric glycidyl compounds as one type of the reactive cross-linking agents (b2) are preferred, among which ethylene glycol diglycidyl ether is more preferred.

In the case where the reactive cross-linking agent (b2) is used, it is usual that at a certain stage after the cross-linking agent is added, the cross-linking reaction is enhanced by preferably being heated to 100 to 230° C., more preferably 120° C. to 160° C. Further, two or more of the reactive cross-linking agents (b2) may be used in combination, and further in combination with a copolymerizable cross-linking agent (b1), in a predetermined amount range.

The cross-linking agent (c) that is not decomposed by hydrolysis in an alkaline environment does not have a hydrolytically decomposable bond in its molecule, and does not generate a hydrolytically decomposable bond as a result of a cross-linking reaction. Examples of the cross-linking agent (c) include a cross-linking agent (c1) having two or more vinyl ether bonds and a cross-linking agent (c2) having two or more allyl ether bonds. A cross-linking agent having two or more allyl ether bonds is preferred from the viewpoint of reactivity and the like.

Examples of the cross-linking agent (c1) having two or more vinyl ether bonds include ethylene glycol divinyl ether, 1,4-butane diol divinyl ether, 1,4-cyclohexane dimethanol divinyl ether, 1,6 hexane diol divinyl ether, polyethylene glycol (polymerization degree: 2 to 5) divinyl ether, bisphenol A divinyl ether, pentaerythritol trivinyl ether, sorbitol trivinyl ether, and polyglycerol (polymerization degree: 3 to 13) polyvinyl ether.

Examples of the cross-linking agent (c2) having 2 or more allyl ether bonds include a cross-linking agent (c21) having 2 allyl groups and no hydroxyl group in its molecule, a cross-linking agent (c22) having 2 allyl groups and 1 to 5 hydroxyl groups in its molecule, a cross-linking agent (c23) having 3 to 10 allyl groups and no hydroxyl group in its molecule, and a cross-linking agent (c24) having 3 to 10 allyl groups and 1 to 3 hydroxyl groups in its molecule. A cross-linking agent having a hydroxyl group in its molecule has good compatibility with a (meth)acrylic acid (salt), which results in improved cross-linking uniformity, which then improves the stability of the gelling agent, thereby making it possible to achieve more excellent long-term stability of viscosity of an alkaline electrolytic solution containing the gelling agent.

Examples of the cross-linking agent (c21) having two allyl groups and no hydroxyl group in its molecule include diallyl ether, 1,4-cyclohexane dimethanol diallyl ether, alkylene (having 2 to 5 carbon atoms) glycol diallyl ether, and polyethylene glycol (weight-average molecular weight: 100 to 4000) diallyl ether.

Examples of the cross-linking agent (c22) having two allyl groups and 1 to 5 hydroxyl groups in its molecule include glycerol diallyl ether, trimethylol propane diallyl ether, pentaerythritol diallyl ether, and polyglycerol (polymerization degree: 2 to 5) diallyl ether.

Examples of the cross-linking agent (c23) having 3 to 10 allyl groups and no hydroxyl group in its molecule include trimethylol propane triallyl ether, glycerol triallyl ether, pentaerythritol tetraallyl ether, and tetraallyl oxyethane.

Examples of the cross-linking agent (c24) having 3 to 10 allyl groups and 1 to 3 hydroxyl groups in its molecule include pentaerythritol triallyl ether, diglycerol triallyl ether, sorbitol triallyl ether, and polyglycerol (polymerization degree: 3 to 13) polyallyl ether.

Two or more of the cross-linking agents (c) that are not decomposed by hydrolysis in alkaline environment may be used in combination. Among the cross-linking agents (c), the cross-linking agents (c2) having two allyl ether bonds are preferred. Among these, the cross-linking agents having 1 to 5 hydroxyl groups and 2 to 10 allyl groups {cross-linking agents (c22) and (c24)} are more preferred. Among these, the cross-linking agents (c24) having 3 to 10 allyl groups and 1 to 3 hydroxyl groups are particularly preferred. Among these, cross-linking agents (c25) having 3 to 5 allyl groups and 1 to 3 hydroxyl groups (pentaerythritol triallyl ether, sorbitol triallyl ether, etc.) are most preferred. Using these cross-linking agents is preferable since it allows efficient cross-linking to be performed. This is because these cross-linking agents have good compatibility with a (meth)acrylic acid (salt), and have a number of allyl groups, thereby compensating for the low copolymerizability inherent to the allyl groups.

In the case where the cross-linked copolymer (A) contains a cross-linking agent (b) unit, the content of the cross-linking agent (b) unit is preferably 0.05 to 3 wt %, more preferably 0.1 to 1 wt % on the basis of the weight of the cross-linked polymer (A), though this depends on the type and the average polymerization degree of the cross-linking agent (b). In the case where the content is in the foregoing range, the syneresis of the alkaline electrolytic solution can be prevented, whereby discharge characteristics over the long term are improved further.

In the case where the cross-linked copolymer (A) contains the cross-linking agent (c) unit, the content (wt %) of the cross-linking agent (c) unit usually is 0.05 to 3 wt %, preferably 0.1 to 1 wt % on the basis of the weight of the cross-linked polymer (A), though depending on the type of the cross-linking agent (c). In the case where the content is in the foregoing range, the repletion of the alkaline electrolytic solution containing the gelling agent when being filled in a battery and the discharge characteristics over the long term of the alkaline electrolytic solution are improved further.

In the case where the cross-linked polymer (A) contains the cross-linking agent (b) unit and the cross-linking agent (c) unit, the weight ratio (b/c) of the cross-linking agent (b) unit to the cross-linking agent (c) unit preferably is 0.25 to 4.0, more preferably 0.4 to 2.5, and particularly preferably 0.5 to 2.0. In the case where the foregoing ratio is in the foregoing range, the stability of the gelling agent is improved further and the reduction of viscosity with time is prevented, whereby the syneresis of the alkaline electrolytic solution is prevented, which results in the retention of the discharge characteristics over a long time. Further, upon filling the alkaline electrolytic solution into a battery, uniform injection can be achieved, whereby variations in the injected amount of the electrolytic solution per battery are reduced. Thus, the foregoing weight ratio is preferable.

The total content of the cross-linking agent (b) unit and the cross-linking agent (c) unit preferably is 0.1 to 6 wt %, more preferably 0.1 to 4 wt %, and particularly preferably 0.1 to 2 wt % on the basis of the weight of the cross-linked polymer (A). In the case where the content is in the foregoing range, the stability of the gelling agent is improved, whereby the long-term stability of the viscosity of the alkaline electrolytic solution containing the gelling agent is improved further.

The following describes a method for producing the gelling agent according to the present invention.

A known polymerization method can be used as a method for polymerization for obtaining the cross-linked polymer (A), and hence, the method may be any one of solution polymerization, suspension polymerization, bulk polymerization, reversed-phase suspension polymerization, or emulsion polymerization.

Among the foregoing polymerization methods, solution polymerization, suspension polymerization, reversed-phase suspension polymerization, and emulsion polymerization are preferred, among which solution polymerization, reversed-phase suspension polymerization, and emulsion polymerization are preferred further, among which solution polymerization and reversed-phase suspension polymerization are preferred particularly. For the polymerization, known polymerization initiator, chain transfer agent, and/or solvent, etc. can be used.

Among the polymerization methods, the most preferable methods are an aqueous solution polymerization method in which the cross-linking agent (b) and the cross-linking agent (c) are added and dissolved in a monomer aqueous solution principally containing a (meth)acrylic acid (salt), and a so-called reversed-phase suspension polymerization method in which a similar monomer aqueous solution is dispersed and suspended in a hydrophobic organic solvent (e.g. hexane, toluene, xylene) in the presence of a disperser. By using such a polymerization method, a gelling agent having excellent discharge characteristics and impact resistance can be obtained.

The method in which a (meth)acrylic acid (salt) is polymerized by the aqueous solution polymerization method or the reversed-phase suspension polymerization method may be a usual method of, for example, using a radical polymerization initiator, or irradiating radioactive rays, ultraviolet rays, or electron rays.

In the case where a radical polymerization initiator is used, examples of such an initiator include:

azo compounds [azobisisovaleronitrile, azobisisobutyronitrile, 4,4'-azobis(4-cyanovaleric acid), 2,2'-azobis [2-methyl-N-(2-hydroxyethyl) propioneamide, 2,2'-azobis(2-amidinopropane)hydrochloride, etc.];

inorganic peroxides [hydrogen peroxide, potassium persulfate, ammonium persulfate, sodium persulfate, etc.];

organic peroxides [di-t-butyl peroxide, cumene hydroperoxide, etc.]; and redox initiators [combinations of a reducing agent and a peroxide, examples of the reducing agent including sulfites and bisulfites of alkali metal salts, ammonium sulfites, ammonium bisulfites, and L-ascorbic acid, and examples of the peroxide including persulfates of alkali metal salts, ammonium persulfate, and hydrogen peroxide water].

Two or more of these may be used in combination.

Though varying with the type of initiator used or the like, the temperature of polymerization preferably is $-10°$ C. to $100°$ C., more preferably $-10°$ C. to $80°$ C. so that the polymerization degree of the (meth)acrylic acid (salt) is increased.

The amount of the initiator is not limited particularly, but in order to increase the polymerization degree of a polymer, it preferably is 0.000001 to 3.0%, and more preferably 0.000001 to 0.5% on the basis of the entire weight of the (meth)acrylic acid (salt).

In the case of aqueous solution polymerization, the polymerization concentration (wt %) of a monomer, though varying with other polymerization conditions, preferably is 10 to 40 wt %, and more preferably 10 to 30 wt %. This is because, if the polymerization concentration is set higher, pseudo-cross-linking (self-cross-linking) of a monomer itself tends to occur with a (meth)acrylic acid (salt) in parallel with the polymerization reaction, thereby resulting in a decrease in the absorption amount and a decrease in the average polymerization degree of a polymer obtained, and further, the temperature control upon polymerization becomes difficult, thereby resulting in a decrease in the average polymerization degree of a polymer obtained and an increase in oligomer components. The polymerization temperature preferably is $-10°$ C. to $100°$ C., and more preferably $-10°$ C. to $80°$ C. The dissolved oxygen amount upon polymerization preferably is 0 to 2 ppm ($2\times10^{-4}$ wt % or less), and more preferably 0 to 0.5 ppm ($0.5\times10^{-4}$ wt % or less), though this depends on the added amount of a free-radical initiator. In the case where the dissolved oxygen amount is in the foregoing range, a cross-linked polymer (A) with a high polymerization degree can be produced.

The neutralization degree of a (meth)acrylic acid upon polymerization is not limited particularly as long as a predetermined amount of the cross-linking agent (b) and/or (c) is dissolved completely in a monomer aqueous solution. However, the cross-linking agent (c) has a smaller water-solubility as compared with that of the cross-linking agent (b), and particularly, the solubility of the cross-linking agent (c) in a (meth)acrylic acid (salt) aqueous solution is extremely small. Therefore, in some cases the cross-linking agent (c) in a predetermined amount, even if being added to a monomer aqueous solution, separates therefrom, thereby causing the predetermined cross-linking to fail. In view of this, it is preferable that polymerization is carried out with the neutralization degree of a (meth)acrylic acid being set to 0 to 30 mol %, and after polymerization, neutralization is carried out further as required so that the neutralization degree is adjusted to a desired level. More preferably, polymerization is carried out in a non-neutralized state, and after polymerization, neutralization is carried out as required.

Further, in the case where a (meth)acrylic acid is polymerized under the same conditions other than the neutralization degree, the lower the neutralization degree, the higher the polymerization degree that is achieved. Therefore, to achieve a higher polymerization degree of a polymer obtained, the polymerization preferably is carried out in a state of a lower neutralization degree.

The reversed-phase suspension polymerization method is a polymerization method in which in a hydrophobic organic solvent such as hexane, toluene, or xylylene, an aqueous solution of a (meth)acrylic acid (salt) is suspended and dispersed in the presence of a disperser so that polymerization is carried out. In this polymerization method also, as in the above-described case, the monomer concentration of the monomer aqueous solution preferably is 10 to 40 wt %, and more preferably 10 to 30 wt %. In the case where the monomer concentration is in the foregoing range, a cross-linked polymer (A) of a high polymerization degree can be produced.

It should be noted that in the foregoing reversed-phase suspension polymerization method, a disperser may be used during polymerization. Examples of the disperser include:

surfactants having a Hydrophile-Lipophile Balance (HLB) degree of 3 to 8 including sorbitan aliphatic acid esters such as sorbitan monostearic acid ester, glycerol aliphatic acid esters such as glycerol monostearic acid ester, and sucrose aliphatic acid esters such as sucrose distearic acid ester; and polymer dispersers (hydrophilic groups: 0.1 to 20 wt %, weight-average molecular weight: 1,000 to 1,000,000) having hydrophilic groups in its molecule and being soluble in a solvent in which a monomer aqueous solution is dispersed, such as maleated ethylene/acrylic acid copolymers, maleated ethylene/vinyl acetate copolymers, and styrene sulfonic acid (salt)/styrene copolymers.

However, a polymer disperser preferably is used as a disperser, since it facilitates the adjustment of the size of suspended particles of a monomer aqueous solution in a solvent, whereby a hydrogel of a cross-linked polymer (A) having a desired particle diameter can be prepared.

The added amount of the surfactant and/or the polymer disperser preferably is 0.1 to 20 wt %, and more preferably 0.5 to 10 wt %, on the basis of the weight of the hydrophobic organic solvent.

The weight ratio (W/O ratio) of the monomer aqueous solution to the hydrophobic organic solvent in reversed-phase suspension polymerization preferably is 0.1 to 2.0, and more preferably 0.3 to 1.0. In the case where the foregoing ratio is in this range, the adjustment of the particle size of the cross-linked polymer (A) is facilitated further.

It is more preferable that in the production of the cross-linked polymer (A), the polymerization is carried out under the same conditions, except for the absence of a cross-linking agent, as those that allow an obtained polymer to have an average polymerization degree of 5,000 to 1,000,000, more preferably 10,000 to 1,000,000. In the case where an adequate amount of a cross-linking agent is used additionally in such a polymerization process performed under the conditions that allow the average polymerization degree to be 5,000 or more, decrease of viscosity and/or increase of spinnability can be prevented from occurring in a high-concentration alkaline aqueous solution to which a gelling agent is added. The measurement of the average polymerization degree was carried out by gel permeation chromatography (GPC).

In the present method, a cross-linked polymer (A), which is obtained by aqueous solution polymerization or reversed-phase suspension polymerization, is obtained in a state of a gel containing water (hydrogel). The hydrogel is used as a gelling agent usually after being dried.

Regarding the method for drying a hydrogel, the following method can be referred to as an example of the same. In the case of aqueous solution polymerization, a hydrogel is fragmented to some extent (to a size of about 0.5 to 20 mm per side) by a meat chopper or a cutter-type primary crusher, or alternatively cut into a noodle form. After the hydrogel is neutralized as required by adding an alkali metal hydroxide or the like thereto, permeation drying (drying is carried out by stacking the hydrogel on a punching metal or a screen and forcedly ventilating hot air of 50 to 150° C. therethrough) or ventilation drying (drying is carried out by placing the hydrogel in a container to which hot air is ventilated/circulated, or by using a machine such as a rotary kiln while further fragmenting the gel) is carried out. Among these, permeation drying is preferred since it allows the hydrogel to be dried efficiently within a short time.

On the other hand, the method for drying a hydrogel in the case of the reversed-phase suspension polymerization usually is carried out by subjecting the polymerized hydrogel and an organic solvent to solid-liquid separation by decantation or another method, and thereafter to vacuum drying (vacuum degree: about 100 to 50,000 Pa) or ventilation drying.

Another method for drying a hydrogel polymerized through aqueous solution polymerization is, for example, contact drying in which the hydrogel is compressed and drawn over a drum dryer so as to be dried. Here, it should be noted that since a hydrogel has a poor heat conductivity, in order to dry a hydrogel in this manner, it is necessary to form a thin film of a hydrogel on the drum or the like, thereby making the degree of contact with the drum metal surface per certain amount of the hydrogel extremely high. Since a commercially available drum dryer usually is made of a metal having a lower ionization tendency than that of zinc, such as iron, chromium, nickel, etc. and the hydrogel is a hydrogel of a poly(meth)acrylic acid (salt), metals having lower ionization tendencies than that of zinc elute in the hydrogel, whereby contents of such metal elements in the hydrogel increase. Still further, the extremely high degree of contact of the hydrogel with the drum and the high tackiness of the hydrogel make it necessary to peel off a dried gel from the drum dryer by a tool like a knife used in contact with the drum dryer. This causes mechanical friction between the drum and the knife, thereby abrading metal surfaces of the drum or the knife. As a result, such metals mix in the dried gel. As described above, when contact drying with use of a drum dryer or the like is used, metal ions or metal powders tend to mix in a gelling agent. As a result, an obtained gelling agent contains a considerably large amount of ions and powders of metals having lower ionization tendencies than that of zinc (metals having lower standard electrode potential, represented with atomic symbols of Cr, Fe, Ni, Sn, Pb, Cu, Hg, Ag, etc.). If such a gelling agent is used as a gelling agent for use in an alkaline battery, zinc powder in the battery, in combination with ions or powders of metals having lower ionization tendencies than that of zinc, forms a battery, thereby causing hydrogen gas to be generated because of electrolysis. This causes the pressure in the battery to rise, and sometimes further causes leakage of the alkaline electrolytic solution, or even breakage of the battery in a worse case. Still further, a thin-film-form dried material obtained by compressing and drawing the hydrogel on a drum dryer or the like, when pulverized so as to have a desired particle diameter, becomes scale-form particles, which have a strength far smaller than block-form pulverized dried material obtained by permeation drying or ventilation drying. Therefore, when such a material swells in a high-concentration alkaline aqueous solution and is stirred and mixed mechanically with zinc powder, the swollen gel breaks down, thereby becoming smaller. Consequently, it is preferable that contact drying using a drum dryer or the like is not used.

In the present invention, the drying temperature upon drying a hydrogel varies depending on the type of a dryer used and the time of drying, but it preferably is 50 to 150° C., and more preferably 80 to 130° C. In the case where the drying temperature is 150° C. or lower, a polymer hardly is cross-linked by the heat due to drying, and hence an excessive rise of the cross-linkage degree due to thermal cross-linkage does not occur. Therefore, the absorption amount does not decrease, and the viscosity thereof in the alkaline electrolytic solution does not decrease. In the case where the drying temperature is 50° C. or higher, the drying does not takes a long time, which is efficient. The drying time also varies depending on the type of a dryer used, the temperature of drying, etc., but it preferably is 5 to 300 minutes, and more preferably 5 to 120 minutes.

A dried material of the cross-linked polymer (A) thus obtained is crushed into a powder form as required. The crushing method may be a usual method, and may be carried out by, for example, using an impact crusher (pin-type mill, cutter mill, squirrel mill, ACM pulverizer, etc.) or an air crusher (jet mill, etc.).

It should be noted that upon crushing the dried material, it is not preferable to use a crusher whose metal rotational elements directly contact each other, since the use of such a crusher would possibly cause metal powder produced by mechanical friction to mix in a gelling agent.

The powder-form cross-linked polymer (A) is screened as required, with use of a screening machine having a desired screen (vibration screen classifier, centrifugal classifier, etc.), so that dried powder having a desired particle diameter can be collected.

It should be noted that in the present invention, preferably a metal powder such as iron powder, which has been mixed in, is removed at a certain stage after drying, by using an iron removing machine utilizing magnetism. However, even if removal of iron is carried out precisely by using an iron removing machine, it is impossible for the iron removing machine to remove metals that do not have magnetism. Besides, if a metal is contained in dried polymer particles or adheres to dried particles, it cannot be removed even if the metal has magnetism. Therefore, it is desired to give sufficient consideration to production facilities also so that such mixing of metals does not occur.

In the present invention, regarding the particle diameter of the cross-linked polymer (A) used, it is preferable that the particle size of a dried powder or the like of the cross-linked polymer (A) is adjusted so that among swollen particles (BA) obtained after swelling and stirring the cross-linked polymer (A) in a 37 wt % aqueous solution of potassium hydroxide, 80 wt % or more of the same has a particle diameter of 32 to 1000 μm, or more preferably 45 to 800 μm. If swollen gelling agent particles having an average particle diameter of 32 to 1000 μm account for less than 80 wt %, sedimentation of zinc powder in an alkaline electrolytic solution in a battery cannot be prevented, and moreover, when a gelling agent is filled in a battery, it is impossible that every battery in any size can be filled uniformly. Then, impairment of discharge characteristics tends to occur, due to the non-uniform filled amounts.

The weight-average particle diameter of the cross-linked polymer (A) in a dried state, which is measured according to JIS Z8815-1994 (6.1 Dry Sieving Test), preferably is 1 to 400 μm, more preferably 10 to 300 μm, particularly preferably 30 to 250 μm, and most preferably 40 to 200 μm, though depending on the swelling magnification of the cross-linked polymer (A) in an alkaline aqueous solution, and the degree of breakage of a gel in the case where it is stirred in an alkaline aqueous solution. The weight-average particle diameter in the foregoing range is preferred since the properties suitable for the high-speed filling are improved further.

The method for producing a gelling agent according to the present invention, which has been described so far, can be summarized as follows.

(i) To a monomer aqueous solution principally containing a (meth)acrylic acid (salt), a cross-linking agent is added {preferably a cross-linking agent (b) that is hydrolytically decomposable in an alkaline environment and a cross-linking agent (c) that is not hydrolytically decomposable in an alkaline environment}, the cross-linking agent(s) being 0.05 to 3 wt % (respectively) on the basis of the weight of the (meth) acrylic acid (salt) (it should be noted that adjustment is needed in a specified range, since the optimal amount of the cross-linking agent varies depending on the average polymerization degree, polymerization concentration, etc. of the polymer). The cross-linking agent is dissolved completely and uniformly in the monomer aqueous solution.

(ii) The polymerization preferably is carried out by aqueous solution polymerization and/or reversed-phase suspension polymerization under mild conditions such that a polymer obtained without use of the cross-linking agents (b) and (c) has an average polymerization degree of 5,000 to 1,000,000, and excessive self-cross-linking (polymerization concentration preferably is not more than 40 wt %) does not occur, so that a hydrogel of the cross-linked polymer (A) is prepared.

(iii) In the case where the polymerization is carried out by aqueous solution polymerization, it is preferable that after the obtained hydrogel is fragmented to some extent as required, a hydroxide of an alkali metal is added to the obtained hydrogel as required so that the neutralization degree thereof is adjusted, and is dried by permeation drying or ventilation drying. In the case where the polymerization is carried out by reversed-phase suspension polymerization, the hydrogel preferably is, after being subjected to solid-liquid separation, dried by vacuum drying or ventilation drying.

It should be noted that drying is performed at a drying temperature (temperature of dried object) of 150° C. or below (preferably 130° C. or below) within a shortest possible time, so that the thermal cross-linkage of the polymer due to heat during drying is prevented also.

(iv) It is preferable that the dried crushed product obtained is subjected to a crushing operation as required, and is screened using a screening machine as required, so that a gelling agent composed of the dried material containing particles with particle diameters of 1 to 400 μm principally is produced. The gelling agent according to the present invention swells as a result of being stirred in an alkaline aqueous solution so that, normally, one side of a particle is magnified by about 2 to 30 times. As a result, a gelling agent that principally contains swollen gel particles having particle diameters of 30 to 1000 μm in the alkaline aqueous solution can be obtained.

(v) The method is carried out with the neutralization degree being maintained in a specified range.

Still further, regarding the viscosity of the gelling agent according to the present invention, both of the viscosity at 40° C. of a gel (GA) after being left to stand one day and the viscosity at 40° C. of the same gel after being left to stand 60 days, preferably are 30 to 300 Pa·s, more preferably 40 to 300 Pa·s, particularly preferably 50 to 200 Pa·s, and most preferably 60 to 100 Pa·s, the gel (GA) being obtained by stirring 2.0 parts by weight of the cross-linked polymer (A), 200 parts by weight of zinc powder, and 100 parts by weight of the 37 wt % aqueous solution of potassium hydroxide so that they are mixed uniformly. In the case where the viscosity is not less than 30 Pa·s, the sedimentation of zinc powder in a battery can be prevented substantially, and in the case where the viscosity is not more than 300 Pa·s, an alkaline electrolytic solution containing the gelling agent of the present invention can be handled relatively easily.

The method described above in the items (i) to (v) is applicable for producing a gelling agent that allows an aqueous solution of potassium hydroxide to which the gelling agent of the present invention is added to have both of the foregoing viscosities in the desired ranges.

Still further, regarding the contents of metal elements having ionization tendencies lower than that of zinc in the gelling agent of the present invention, such contents of metal elements can be controlled so as to fall in a range of 0 to 15 ppm (not more than $15 \times 10^{-4}$ wt %), preferably in a range of 0 to 10 ppm (not more than $10 \times 10^{-4}$ wt %) in the gelling agent, by giving sufficient consideration to materials used and the above-described production facilities also.

Though depending on the structure and capacitance of a battery used and an added amount of the gelling agent in the battery, the content in the gelling agent of metal elements having ionization tendencies lower than that of zinc preferably is not more than 15 ppm, because the following problem hardly occurs: zinc powder in a battery and metal ions or metal powders mixing therein form a battery, thereby causing hydrogen gas to be generated because of electrolysis, which causes the pressure in the battery to rise, and further causes leakage of the alkaline electrolytic solution and breakage of the battery.

The amount of soluble components of the gelling agent of the present invention in a 37 wt % aqueous solution of potassium hydroxide preferably is not more than 30 wt % (0 to 30 wt %), and more preferably not more than 20 wt %, on the basis of the weight of the gelling agent. Particularly preferably, the foregoing amount is not more than 15 wt %.

The amount of soluble components of the gelling agent in a range of not more than 30 wt % is preferred since problems of increased spinnability of the alkaline aqueous solution and long-term reduction of the viscosity are not caused.

To reduce the amount of soluble components, the average polymerization degree of a polymer may be increased, or alternatively, the amount of a cross-linking agent may be increased. However, an increase in the cross-linking agent amount causes the absorption amount of the gelling agent to decrease, which results in reduction of the viscosity of an alkaline aqueous solution to which the gelling agent is added, in some cases. Therefore, it is preferable that the average polymerization degree of a polymer is set to be higher.

An alkaline battery in which the gelling agent of the present invention can be used as a gelling agent for an alkaline electrolytic solution is not limited particularly. The gelling agent can be used in ordinary alkaline batteries such as LR-20 type batteries (size D alkaline batteries) and LR-6 type batteries (size AA alkaline batteries), and other various types of alkaline batteries. An alkaline battery usually has a structure such that a positive electrode agent, a charge collector rod, and a gel negative electrode are sealed in an outer can, in which the positive electrode agent and the gel negative electrode are separated from each other by a separator or the like.

FIG. 1 illustrates an exemplary cross-sectional structure of an alkaline battery of the present invention. In FIG. 1, "1" denotes a positive electrode terminal plate, "2" denotes a shrinkable tube, "3" denotes a positive agent (composed of $MnO_2$ and carbon, etc.), "4" denotes an outer can, "5" denotes a separator, "6" denotes a charge collector rod, "7" denotes a gasket, "8" denotes a negative electrode terminal plate, and "9" denotes a gel negative electrode 9. As described above, the alkaline battery has a structure such that the positive electrode agent 3, the charge collector rod 6, and the gel negative electrode 9 are sealed in the outer can 4, and the positive electrode agent 3 and the gel negative electrode 9 are separated from each other by the separator 5.

Though the following examples do not limit the present invention particularly, the positive electrode terminal plate 1 is formed with, for example, a nickel-plated steel sheet. The shrinkable tube 2 is formed with, for example, a tube of a heat-shrinkable resin such as polyethylene, polypropylene, polystyrene, poly(vinyl chloride), or polyester resin. The positive electrode agent 3 ($MnO_2$+carbon, etc.) is made of, for example, natural manganese dioxide or electrolytic manganese dioxide as a manganese dioxide component, or nickel oxyhydroxide as an alternative to manganese dioxide, or the like, and acetylene black as a carbon component, to which an alkaline electrolytic solution may be added further as required. The outer can 4 is formed with, for example, a nickel-plated steel sheet. Examples of the material for the separator 5 include alkali-resisting cellulose, nylon, polyolefin, acrylonitrile-vinyl chloride copolymer, polyvinyl alcohol, and combinations of these. The charge collector rod 6 is formed with, for example, a tin-plated brass rod or a tin-plated iron rod. The gasket 7 is formed with, for example, a nylon-based resin or a polyolefin-based resin. The negative electrode terminal plate 8 is formed with, for example, a nickel-plated steel sheet. Used as the gel negative electrode 9 are an alkaline electrolytic solution (aqueous solution of potassium hydroxide, etc.) and zinc powder (and/or zinc alloy powder), as well as another additive when necessary, to which the gelling agent of the present invention is added.

Examples of the method for filling the gelling agent of the present invention into an alkaline battery include: (a) preliminarily mixing the gelling agent of the present invention, an alkaline electrolytic solution (e.g. a high-concentration aqueous solution of potassium hydroxide, which contains zinc oxide or the like as required), and zinc powder (and/or zinc alloy powder), as well as another additive when necessary, so as to prepare a mixture for the cathode material, filling the foregoing material in a cathode container of the battery so that it functions as the gel-form negative electrode; and (b) filling the gelling agent of the present invention and zinc powder (and/or zinc alloy powder), as well as another additive when necessary, in a cathode container of the battery, and thereafter filling an alkaline electrolytic solution therein so that a gel-form negative electrode is generated in the cathode container. Among these, the method (a) is preferred since zinc powder can be dispersed uniformly in the cathode container of the battery.

The amount of the gelling agent to be added varies depending on the structure of the cathode container, the particle diameter of the zinc powder, and the concentration of the alkaline electrolytic solution, but it preferably is 0.5 to 10 wt %, and more preferably 1.0 to 5.0 wt % on the basis of the alkaline electrolytic solution. In the case where the added amount is 0.5 to 10 wt %, the alkaline electrolytic solution has an appropriate viscosity, which prevents the sedimentation of zinc powder and provides an improved handling property.

The gelling agent of the present invention may contain, in addition to the cross-linked polymer (A), another additive (hereinafter referred to as second additive) as required in a range such that impairment of the workability and the battery characteristics would not occur, with a view to improving the flowability of a mixture as the cathode material when it is filled.

Examples of the second additive include another gelling agent (hereinafter referred to as second gelling agent) and a vibration-impact-resistance improving agent.

Examples of the second gelling agent include fine powders of CMC (carboxymethyl cellulose), natural rubber (guar gum, etc.), non-cross-linked poly(meth)acrylic acid (salt), slightly cross-linked poly(meth)acrylic acid (salt), and the gelling agent of the present invention, as well as water-soluble resins such as polyvinyl alcohol. Among these, fine-powder-form slightly cross-linked poly(meth)acrylic acid (salt), fine powder of the gelling agent of the present invention, and the like are preferred since the resin itself has a relatively small spinnability, and provides flowability to the negative electrode gel when being filled in a cathode container.

The particle diameter of such a thickener (viscosity improver) that is added as required is not particularly limited, but the weight-average particle diameter of the same in a dried state preferably is 0.1 to 100 μm, and more preferably 0.1 to 50 μm. In the case where the particle diameter is in this range, some increase in the spinnability of the cathode material mixture due to the addition of the second additive does not significantly affect the filled amount of the cathode material mixture per battery, since the particles swollen in an alkaline environment are small. Thus, the particle diameter in this range is preferred.

As the vibration-impact-resistance improving agent, an oxide, a hydroxide, a sulfide or the like of a metal element selected from the group consisting of indium, tin, and bismuth can be used.

When the second additive is added, the content thereof preferably is 0 to 5.0 wt %, and more preferably 0 to 3.0 wt % on the basis of the alkaline electrolytic solution.

Examples of the method for adding the second gelling agent include: a method of carrying out dry pre-blend of the gelling agent of the present invention and the second gelling agent, followed by blending the same with other cathode materials such as zinc powder and an alkaline electrolytic solution; a method of adding and mixing the second gelling agent, separately from the gelling agent of the present invention, when the cathode material mixture is prepared; and a method of mixing an alkaline electrolytic solution and the second gelling agent, followed by mixing the gelling agent of the present invention and zinc powder. However, any method may be used as long as the predetermined amount of the second gelling agent, if necessary, can be added.

As described above, (i) even if the cross-linked polymer (A) polymerized by aqueous solution polymerization or reversed-phase suspension polymerization is stirred in an alkaline aqueous solution, it is possible to prepare a gel not prone to breakage. Therefore, in the case where the cross-liked polymer (A) is used as a gelling agent for an alkaline battery, zinc powder adheres uniformly around gel particles swollen with an alkaline electrolytic solution, thereby improving the discharge characteristics and the lifetime of the battery. Further, since the swollen gel particles with zinc powder adhering uniformly therearound has absorbed the alkaline electrolytic solution upon swelling, the substantial concentration of zinc powder in the electrolytic solution rises, thereby resulting in an increase of the frequency of contact between zinc powder particles. This improves the discharge characteristics and the lifetime. Moreover, since the cross-linked polymer (A) is filled uniformly in a battery, the gel has less flowability, which prevents the voltage and the short-circuit current from lowering even when subjected to an impact. (ii) The polymerization can be carried out under control of the polymerization temperature or under mild conditions, and water having a low chain transfer constant is used as a solvent. Therefore, the average polymerization degree of the polymer and the reduction of oligomer components can be achieved. Therefore, in the case where it is used as a gelling agent for a battery, both the stability of viscosity and the spinnability of a high-concentration alkaline aqueous solution are achieved. As a result, the improvement of workability of the alkaline electrolytic solution upon high-speed filling in a battery due to the reduced spinnability, and the improvement of battery characteristics due to the uniform filling of the electrolytic solution gel in a battery are achieved at the same time.

EXAMPLE

The following further describes the present invention while referring to Examples and Comparative Examples, which however do not limit the present invention. Hereinafter, unless provided specifically, "%" refers to percent by weight, "ultrapure water" refers to water having an electric conductivity of 0.06 µS/cm or less, and "ion-exchange water" refers to water having an electric conductivity of 1.0 µS/cm or less.

The following describes the test method used in Examples.

(i) Weight-average particle diameter of the cross-linked polymer (A)

The weight-average particle diameter of the cross-linked polymer (A) in a dried state was measured according to JIS Z8815-1994 (6.1 Dry Sieving Test) [corresponding to ISO2591-1]. Sieves (frame diameter: 200 mm, depth: 45 mm) having mesh-openings of 1 µm, 5 µm, 25 µm, 53 µm, 106 µm, 150 µm, 300 µm, 500 µm, and 710 µm respectively, produced according to JIS Z8801-1: 2000 (corresponding to ISO/FDIS3310-1: 1999), were superposed on one another in an opening-size-descending order from the top, and the cross-linked polymer (A) was sieved.

The weight-average particle diameter of the cross-linked polymer (A) is a value calculated by Formula (12) described in JIS Z8819-2:2001 (corresponding to ISO/FDIS9276-2: 1999), item 5.2, for measuring the number-average diameter of the weighted average particle diameter.

(ii) Particle diameter and content of swollen particles (BA) of the cross-linked polymer (A) after stirred in 37% aqueous solution of potassium hydroxide:

<Preparation of Swollen Particles (BA)>

In a 500-ml beaker, 2 g of the cross-linked polymer (A), 300 g of 37% aqueous solution of potassium hydroxide, and a rotor (length: 4 cm) were placed, and were stirred by a magnetic stirrer at a speed of 600 rpm at 25° C. for 3 hours so as to be mixed uniformly, whereby swollen particles (BA) were obtained.

<Content of Swollen Particles Having Particle Diameters of 32 to 1,000 µm in the Swollen Particles (BA)>

The swollen particles (BA) were poured onto a 20 cm-diameter sieve that was formed by arranging a 400-mesh screen (mesh-opening of the screen: 32 µm) and a 16-mesh screen (mesh-opening of the screen: 1000 µm) so that the former was on the lower side and the latter was on the upper side according to JIS Z8801-1:2000, and the sieve was washed several times with 40% aqueous solution of potassium hydroxide. The sieve was left to stand for 30 minutes so as to be drained, and the aqueous solution of potassium hydroxide adhering to the screens were wiped out. Then, the swollen particles left on the 400-mesh screen were weighed, and the content (%) of swollen particles having particle diameters of 32 to 1000 µm in the swollen particles (BA) was determined according to the following formula.

$$\text{Content}(\%) \text{ of swollen particles having diameters of 32 to 1,000 µm} = 100 \times \frac{[\text{Weight}(g) \text{ of swollen particles on screen with mesh-opening of 32 µm}]}{[2 \times \text{absorption amount}(g/g) \text{ of cross-linked polymer}(A)]}$$

<Content of Swollen Particles Having Diameters of 45 to 850 µm in the Swollen Particle (BA)>

The content (%) of swollen particles having diameters of 45 to 850 µm in the swollen particles (BA) was determined in the same manner except that a screen having a mesh-opening of 45 µm was used in place of the screen having a mesh-opening of 32 µm and a screen having a mesh-opening of 850 µm was used in place of the screen having a mesh-opening of 1000 µm.

$$\text{Content}(\%) \text{ of swollen particles having diameters of 45 to 850 µm} = 100 \times \frac{[\text{Weight}(g) \text{ of swollen particles on screen with mesh-opening of 45 µm}]}{[2 \times \text{absorption amount}(g/g) \text{ of cross-linked polymer}(A)]}$$

(iii) Absorption amount (tea bag method) of the cross-linked polymer (A) with respect to 37% aqueous solution of potassium hydroxide:

An absorption amount was determined under the following conditions and calculated by the formula shown below according to JIS K7223-1996:

sample used: 2.0 g of the cross-linked polymer (A);

mesh-opening of nylon screen forming a tea bag: 32 µm (400 mesh);

test liquid: 37% aqueous solution of potassium hydroxide (guaranteed reagent)

immersion time: 1 hour draining time: 30 minutes $$\text{Absorption amount (g/g)} = \frac{[\text{Weight(g) of tea bag containing sample after immersion and draining}] - [\text{Average weight of tea bag without sample after immersion and draining}]}{2}$$

(iv) Viscosity ratio (N1/N60) of gel (GA):

<Viscosity (40° C., N1) of Gel (GA) After Being Left to Stand for One Day>

Preliminarily 2 g of the cross-linked polymer (A) and 200 g of zinc powder were mixed by a Nauta-mixer, and the obtained mixture was placed in a 200-ml lidded transparent plastic container. Then, 100 g of 37% aqueous solution of potassium hydroxide was poured therein little by little while being stirred in a manner such that the ingredients should not become lumpy. One hour later, it was confirmed that the ingredients were gelled (or thickened) uniformly thereby becoming a gel (GA), and then, the gel (GA) was left to stand in a constant temperature bath at 40° C. for one day in a state of being sealed with a lid. The viscosity of the gel (GA) was measured according to JIS7117-1:1999 using a digital B-type viscometer (TOKIMEC INC.), which is regarded as the viscosity (40° C., N1) of the gel (GA) after being left to stand for one day (measurement temperature: 40° C., rotor: No. 4, rotation speed: 3 rpm).

<Viscosity (40° C., N60) of Gel (GA) After Being Left to Stand for Sixty Days>

The sample having been subjected to the measurement of the viscosity (40° C., N1) of the gel (GA) after being left to stand for one day was sealed and left to stand for 59 days more in the constant temperature bath at 40° C. The viscosity of the gel (GA) was determined under the same conditions for the viscosity (40° C., N1), and the obtained value was regarded as the viscosity (40° C., 60N) of the gel (GA) after being left to stand for sixty days.

<Viscosity Ratio (N1/N60) of Gel (GA)>

The viscosity ratio (N1/N60) of the gel (GA) was obtained by the following formula.

$$\text{Viscosity ratio } (N1/N60) = \frac{\text{Viscosity}(40°\text{ C.}, N1) \text{ of gel}(GA) \text{ after being left to stand for one day}}{\text{Viscosity}(40°\text{ C.}, N60) \text{ of gel}(GA) \text{ after being left to stand for sixty day}}$$

(v) Content of metal elements having ionization tendencies lower than that of zinc:

In a "Teflon" (registered trademark) decomposition container attached to a wet ashing machine (manufactured by Milestone Inc.:

"MLS-1200MEGA"), 0.5 g of the gelling agent, 3 ml of hydrochloric acid, and 4 ml of nitric acid were placed and sealed. The "Teflon" (registered trademark) decomposition container was set in the wet ashing machine and was operated so that the sample was decomposed completely. Ultrapure water was added to the decomposed sample so that an amount of the obtained liquid was adjusted to be 9 g in total, and measurement by inductively coupled radio-frequency plasma spectrometry (ICP) was carried out regarding contents of metal elements of iron (Fe), nickel (Ni), chromium (Cr), tin (Sn), lead (Pb), copper (Cu), and silver (Ag). Separately, calibration curves were created regarding the foregoing metal elements by using standard solutions, and using the calibration curves, and the respective contents of the foregoing metals were determined.

$$\text{Content of metal elements (wt \%)} = \frac{\text{Total amount}(wt\%) \text{ of metal elements (Fe, Ni, Cr, Sn, Pb, Cu, and Ag) in gelling agent}}{0.5 (g)} \times 9$$

In the forgoing formula, "0.5 (g)" refers to the weight of the gelling agent.

(iv) Soluble component amount in 37% aqueous solution of potassium hydroxide:

In a 500-ml beaker, 1.0 g of the gelling agent and 200 g of 37% aqueous solution of potassium hydroxide were placed, and were stirred by a magnetic stirrer at 300 rpm for 3 hours. The stirred solution was filtered with use of a filter paper (manufactured by ToyoRoshi Kaisha Ltd., No. 2 type), whereby a filtrate was obtained. 30 g of ion-exchange water was added to 20 g of the filtrate, and further 10% aqueous solution of sulfuric acid was added thereto so that the pH thereof was adjusted to be 7.0, whereby a sample solution was obtained. Separately, 30 g of ion-exchange water was added to 20 g of 37% aqueous solution of potassium hydroxide used in preparing the filtrate, and further 10% aqueous solution of sulfuric acid was added thereto so that the pH thereof was adjusted to be 7.0, whereby a blank solution was prepared.

0.01 N aqueous solution of potassium hydroxide was dropped into the sample solution by using an automatic titration machine (manufactured by Mitsubishi Chemical Corporation, GT-05 type) so that the pH of the sample solution was adjusted to be 10.0 temporarily, and thereafter, 0.01 N aqueous solution of hydrochloric acid was dropped into the sample solution to determine an amount [ml(Va)] of the 0.01 N aqueous solution of hydrochloric acid dropped until pH of the sample solution became 2.7.

The same operation was performed with respect to the blank solution, to determine a dropped amount [ml(Vb)] of the aqueous solution of hydrochloric acid with respect to the blank solution.

Both of the foregoing operations were carried out at 25° C.

In the case where the constituent monomer of the cross-linked polymer (A) is composed of only acrylic acid, an amount (%) of soluble components of the gelling agent, which are soluble in an aqueous solution of potassium hydroxide, was calculated by Formulas-1, -2, and -3:

$$M = (Va - Vb) \times N \qquad \text{(Formula-1)}$$

where

M represents an amount (mmol) of potassium acrylate in the sample solution; and

N represents a normality of aqueous solution of hydrochloric acid.

$$W = M \times E \times D \qquad \text{(Formula-2)}$$

where

W represents a weight of potassium acrylate in the sample;

E represents 110 (molecular weight of potassium acrylate); and

D represents a dilution factor (200/20).

$$\text{Soluble component amount (\%)} = W(g) \times 100/1 (g) \qquad \text{(Formula-3)}$$

where "1 (g)" in Formula-3 represents a weight of the sample.

Alternatively, in the case where the constituent monomer of the cross-linked polymer (A) is composed of only methacrylic acid, the foregoing symbol "E" represents 124 (molecular weight of potassium methacrylate). With regard to a polymer obtained by copolymerizing an acrylic acid and a methacrylic acid, and with regard to a polymer obtained by copolymerizing monomers other than the (meth)acrylic acids, the value represented by "E" is revised by calculating a carboxylic acid amount per unit molecular weight (the soluble component amount is calculated with an assumption that contents copolymerized at a certain weight ratio are present in soluble component contents at the same weight ratio).

Example 1

In a 2-liter beaker, 200 g of acrylic acid, 0.6 g (0.3 wt %/acrylic acid) of pentaerythritol triallyl ether (produced by DAISO CO., LTD.), 0.6 g (0.3 wt %/acrylic acid) of trimethylol propane triacrylate, and 800 g of ion-exchange water were placed, and were stirred so as to be mixed. Thus, an aqueous solution of acrylic acid was prepared, and was cooled to 8° C.

The aqueous solution of acrylic acid was poured in a 1.5-liter adiabatic polymerization tank, and nitrogen was introduced into the aqueous solution so that a dissolved oxygen amount in the aqueous solution of acrylic acid was adjusted to be 0.1 ppm or less. In the adiabatic polymerization tank, 4.0 g of 0.1% hydrogen peroxide water, 4.0 g of 0.1% aqueous solution of L-ascorbic acid, and 1.0 g of 10% aqueous solution of 2,2'-azobis(2-amidinopropane)hydrochloride (produced by WAKO PURE CHEMICAL INDUSTRIES, LTD., trade name: "V-50") were added thereto, and the purge of dissolved oxygen by introducing nitrogen in the aqueous solution was continued until the polymerization started. After it was observed that polymerization started and the viscosity of the aqueous solution of acrylic acid started increasing, the purge of dissolved oxygen by introducing nitrogen was stopped, and the polymerization was left to continue for 6 hours. The temperature of the aqueous solution of acrylic acid was measured by a multi-point thermometer, and it was determined that the highest temperature achieved was 63° C.

It should be noted that the average polymerization degree of a polymer polymerized under the same conditions except for the use of the foregoing two types of cross-linking agents was determined by gel permeation chromatography (GPC) to be about 28,000.

The block-type cross-linked hydrogel thus obtained was removed out of the adiabatic polymerization tank, and was fragmented by a small-size meat chopper (manufactured by Loyal Co., Ltd.) into noodle form so that each piece had a diameter of 3 to 10 mm. Thereafter, 222 g of 40% aqueous solution of sodium hydroxide (guaranteed reagent) was added thereto, so as to neutralize the hydrogel (neutralization degree: 80 mol %).

The hydrogel thus neutralized was stacked with a thickness of 5 cm on a screen made of a SUS material having a mesh-opening of 850 μm, and hot air at 120° C. was infiltrated through the hydrogel for one hour by using a small-size permeation dryer (manufactured by Inokin Co., Ltd.) so as to dry the hydrogel.

The dried material was crushed by using a household mixer, and particles of the same having particle diameters of 32 to 500 μm (400 mesh to 30 mesh) were collected by using sieves, whereby a gelling agent (1) of the present invention was obtained.

Regarding the foregoing gelling agent (1), the following were determined: weight-average particle diameter; content of metal elements; absorption amount with respect to 37% aqueous solution of potassium hydroxide; viscosity (40° C., N1) of a gel (GA) after being left to stand for one day; viscosity (40° C., N60) of the gel after being left to stand for sixty days; viscosity ratio (N1/N60); particle diameter of swollen particles (BA) (content of particles having diameters of 32 to 1000 μm, content of those having diameters of 45 to 850 μm); and, amount of components soluble in 37% aqueous solution of potassium hydroxide.

The same determination operations were carried out with respect to Examples 2 to 13 and Comparative Examples 1 to 8. The results are shown in Tables 1 and 2.

Example 2

The same operations as those of Example 1 were carried out except that ethylene glycol diglycidyl ether (produced by Nagase ChemteX Corporation, trade name: "Denacol 810") was used in place of trimethylol propane triacrylate in Example 1. As a result, a gelling agent (2) of the present invention was obtained.

Example 3

The same operations as those of Example 1 were carried out except that the added amount of pentaerythritol triallyl ether was changed to 0.2 g (0.1%/acrylic acid). As a result, a gelling agent (3) of the present invention was obtained.

Example 4

In a 1-liter beaker, 100 g of acrylic acid, 272.2 g of ion-exchange water, and 0.2 g (0.2 wt %/acrylic acid) of pentaerythritol triallyl ether were placed and mixed, and the cross-linking agent was dissolved therein. While the beaker was cooled with an ice bath, 100 g of 40% aqueous solution of sodium hydroxide was added thereto so that a part (72 mol %) of acrylic acid was neutralized. The monomer solution thus neutralized was cooled to 5° C., and thereafter, 0.2 g of potassium persulfate was added thereto as a polymerization initiator, whereby a monomer aqueous solution was obtained.

In a 2-liter separable flask equipped with an agitator and a condenser, 1000 ml of cyclohexane and 10 g of sodium styrene sulfonate/styrene block copolymer as a disperser were stirred while the ingredients were heated to 60° C. with a water bath, so that the disperser was dissolved in cyclohexane.

Nitrogen was introduced into the cyclohexane solution in the separable flask so that a dissolved oxygen amount in cyclohexane was adjusted to be 0.1 ppm or less. Thereafter, while cyclohexane was stirred by the agitator, 400 g of the monomer aqueous solution thus obtained and 80 g (0.4 wt %/acrylic acid) of 0.5% aqueous solution of ethylene glycol diglycidyl ether were dropped by using a dropping funnel, so that reversed-phase suspension polymerization was performed at a polymerization temperature of 60° C. Further, after the dropping of the monomer aqueous solution was completed, the heating was continued further for 2 hours, so that the suspension polymerization was completed. As a result, a hydrogel in a spherical form was obtained in cyclohexane.

After the rotation of the agitator was stopped and the hydrogel thus obtained settled down, cyclohexane was removed by decantation. The remaining hydrogel was washed with cyclohexane several times so that the disperser adhering to the hydrogel was removed.

The spherical-form hydrogel thus obtained was spread over a release paper, and was dried by a vacuum dryer (vacuum degree: 10,000 to 20,000 Pa) at 80° C. for 2 hours. The particle diameter of the dried material were measured, and it was determined that particles having diameters of 45 to 850 μm accounted for 92%. Therefore, without any change, the dried material thus obtained was used as a gelling agent (4) of the present invention.

It should be noted that the relationship between the vacuum degree and the actual pressure in the present invention was as follows:

Actual pressure =

Normal atmospheric pressure $(1.013 \times 10^5$ Pa$)$ − Vacuum degree

Example 5

85 g of the gelling agent of the present invention obtained in Example 1 and 15 g of a commercially-available slightly cross-linked type polyacrylic acid fine powder (produced by Nihonjunyaku Co., Ltd., trade name: "JUNLON PW-150"), obtained by sedimentation polymerization, were blended in powder form, whereby a gelling agent (5) of the present invention was obtained.

Example 6

Particles having diameters of 500 μm or more were collected by using a screening machine out of the gelling agent obtained in Example 1, whereby a gelling agent (6) of the present invention was obtained.

Example 7

Particles having diameters of 32 μm or less were collected by using a screening machine out of the gelling agent obtained in Example 1, whereby a gelling agent (7) of the present invention was obtained.

Example 8

The same operations as those of Example 1 were carried out except that trimethylol propane triacrylate was not used. As a result, a gelling agent (8) of the present invention was obtained.

Example 9

The same operations as those of Example 1 were carried out except that the following method was used as a drying method. As a result, a gelling agent (9) of the present invention was obtained.

(Drying Method)

A fragmented hydrogel was placed between a drum dryer made of an alloy of iron and chromium (manufactured by Kusunoki Kikai Seisakusho), which was heated to 160° C., and a pressure roll made of "Teflon" (registered trademark) attached to the drum dryer (clearance between the drum dryer and the pressure roll: 0.5 mm), and the hydrogel was rolled with a thickness of 0.5 mm on the drum dryer and dried for 3 minutes. After drying, a knife (made of a SUS material) attached to the drum dryer was brought into contact with the drum dryer, so as to separate the dried film from the drum dryer. The thickness of the film was determined by a thickness gauge to be about 0.2 mm.

The dried film was crushed by a household mixer, and particles having diameters of 3 to 500 μm were collected by a screening machine.

Example 10

The same operations as those of Example 1 were carried out except that the added amount of trimethylol propane triacrylate was changed to 0.06 g (0.03%/acrylic acid). As a result, a gelling agent (10) of the present invention was obtained.

Example 11

The same operations as those of Example 1 were carried out except that the added amount of trimethylol propane triacrylate was changed to 8.0 g (4.0%/acrylic acid). As a result, a gelling agent (11) of the present invention was obtained.

Example 12

The same operations as those of Example 1 were carried out except that the added amount of pentaerythritol triallyl ether was changed to 0.2 g and the added amount of trimethylol propane triacrylate was changed to 0.35 g. As a result, a gelling agent (12) of the present invention was obtained.

Example 13

The same operations as those of Example 1 were carried out except that the added amount of pentaerythritol triallyl ether was changed to 0.8 g and the added amount of trimethylol propane triacrylate was changed to 0.4 g. As a result, a gelling agent (13) of the present invention was obtained.

Comparative Example 1

Commercially-available carboxyl methyl cellulose ("CMC2450" produced DAICEL CHEMICAL INDUSTRIES, LTD.) was used as a comparative gelling agent (H1).

Comparative Example 2

Commercially-available slightly cross-linked type polyacrylic acid fine powder ("Carbopole 941" produced by B. F. Goodrich Chemical Company, average particle diameter: about 20 μm) was used as a comparative gelling agent (H2).

Comparative Example 3

20 g of methanol aqueous solution [mixture of methanol/water=70/30 (weight ratio)] was added to 20 g of commercially-available slightly cross-linked type polyacrylic acid fine powder ("JUNLON PW-150" produced by Nihonjunyaku Co., Ltd., average particle diameter: about 20 μm), obtained by sedimentation polymerization, and the mixture was stirred so as to be granulated. The granulated product was dried by an air circulating dryer at 100° C., and thereafter it was crushed lightly by a household mixer. Particles having particle diameters of 210 to 850 μm were collected therefrom by a screening machine. The material thus collected was used as a comparative gelling agent (H3).

Comparative Example 4

The same operations as those of Example 1 were carried out except that pentaerythritol triallyl ether was not used. As a result, a comparative gelling agent (H4) was obtained.

Comparative Example 5

The same operations as those of Example 1 were carried out except that the added amount of pentaerythritol triallyl ether was changed to 0.06 g (0.3%/acrylic acid). As a result, a comparative gelling agent (H5) was obtained.

Comparative Example 6

The same operations as those of Example 1 were carried out except that the added amount of pentaerythritol triallyl ether was changed to 8.0 g (4.0%/acrylic acid). As a result, a comparative gelling agent (H6) was obtained.

Comparative Example 7

The same operations as those of Example 1 were carried out except that the added amount of an added polymerization initiator (hydrogen peroxide, ascorbic acid, and "V-50") was increased to 10 times, and that 20% ethanol aqueous solution [ethanol/water=20/80 (weight ratio)] was used instead of ion-exchange water. As a result, a comparative gelling agent (H7) was obtained.

It should be noted that regarding a polymer obtained by polymerization without use of pentaerythritol triallyl ether and trimethylol propane triacrylate as a cross-linking agent, an average polymerization degree thereof was determined by GPC to be about 1,700.

Comparative Example 8

The same operations as those of Example 1 were carried out except that the cross-linking agents of the two types used in Example 1 were not used. As a result, a comparative gelling agent (H8) was obtained.

Using the gelling agents (1) to (5) prepared in Examples 1 to 13, the comparative gelling agents (H1) to (H8) prepared in Comparative Examples 1 to 8, and an alkaline electolytic solution, the sedimentation property of zinc powder (produced by UNION MINIERES. A., product name: "004F(2)/68"), the injection time and the variability of injected amount, the amount of hydrogen gas generated, the duration of a model battery, and the impact resistance of the same were determined in the following manners. The results are shown in Tables 3 and 4.

(Sedimentation Property of Zinc Powder)

In a 1-liter biaxial kneader (produced by IRIE SHOKAI Co., Ltd., product name: "PNV-1"), 150 g of 37% aqueous solution of potassium hydroxide, 300 g of zinc powder having an average particle diameter of 120 μm, 2.5 g of the gelling agent, and 0.5 g of a thickener (trade name: "JUNLON PW-150") were placed, and are mixed at a rotation speed of 50 rpm for 60 minutes, whereby a negative electrode gel was prepared.

50 g of the negative electrode gel thus prepared was placed in a sealable 50-ml sample container (diameter: 34 mm, height: 77 mm, made of polypropylene), and air bubbles contained upon mixing were removed under a reduced pressure.

The sample container was sealed and left to stand in a constant temperature vessel at 40° C. for 30 days, and thereafter, the sample container was subjected to tapping 300 times at a rate of 30 times per minute from a height of 3 cm by using a device attached to a powder tester (manufactured by Hosokawa Micron Corporation) so that the sedimentation of zinc powder was accelerated. After the tapping was stopped, the distance (mm) between the initial position of zinc powder (the position of the upper end portion of the negative electrode gel in the sample container) and the position of zinc powder when it settled down was measured, and this was used as a sedimentation property (mm) of zinc powder.

(Injection Time and Variability of Injected Amount)

In a 1-liter biaxial kneader, 150 g of 37% aqueous solution of potassium hydroxide, 300 g of zinc powder having an average particle diameter of 120 μm, 2.5 g of the gelling agent, and 0.5 g of a thickener (trade name: "JUNLON PW-150") were placed, and mixed at a rotation speed of 50 rpm for 60 minutes, whereby a negative electrode gel was prepared. The negative electrode gel thus prepared was transferred into a beaker, and air bubbles contained upon mixing were removed under a reduced pressure.

The aqueous solution of potassium hydroxide in a gel form from which air bubbles had been removed, was sucked by a 20-ml syringe calibrated in 0.1 ml, having an inlet with an internal diameter of 2 mm.

At a height of an opening of a 5-ml sample container (internal diameter: 18 mm, height: 40 mm), the syringe was compressed by 2.0 ml so that the gel-form aqueous solution of potassium hydroxide was injected into the sample container. The time (second) from the stop of the compression of the syringe until complete separation of the gel-form aqueous solution of potassium hydroxide from the inlet of the syringe was measured with a stop watch. The same operation was repeated 20 times in total, and an average of the measured times was regarded as an injection time (second).

The weight of the aqueous solution of potassium hydroxide injected into the sample container were measured (20 times), and a standard deviation ($\alpha$) of the injected amount was calculated, which was regarded as variability of the injected amount.

(Amount of Hydrogen Gas Generated)

In a 50-ml sample container (diameter: 34 mm, height: 77 mm, made of polypropylene), 15 g of aqueous solution of potassium hydroxide, 30 g of zinc powder having an average particle diameter of 120 μm, 0.25 g of the gelling agent, and 0.05 g of a thickener (trade name: JUNLON PW-150") were placed, and are mixed at a rotation speed of 50 rpm for 60 minutes.

The sample container was sealed with a lid (having a hole with a diameter of about 3 mm in which a gas detector tube could be inserted, the hole being closed with a seal tape), and was left to stand in a constant temperature vessel at 50° C. for 30 days.

The sample container was taken out 30 days later, and a hydrogen gas detector tube (Kitagawa Gas Detector Tube System, manufactured by KOMYO RIKAGAKU KOGYO K. K., hydrogen gas measuring range: 500 to 8000 ppm) was inserted into a gas-phase part in the sample container via the hole preliminarily opened, so that a hydrogen gas concentration in the gas-phase part was measured.

(Duration of Battery)

In a 1-liter biaxial kneader, 150 g of 37% aqueous solution of potassium hydroxide, 300 g of zinc powder, 2.5 g of the gelling agent, and 0.5 g of a thickener were placed, and are mixed at 50 rpm for 60 minutes, whereby a negative electrode gel was prepared.

After air bubbles were removed under a reduced pressure, 15 g of the negative electrode gel thus obtained was injected into a negative electrode container of a LR-6 type model battery as shown in FIG. 1 so as to function as the gel negative electrode 9. Thus, the model battery was prepared. As the materials for the other members of the model battery other than the gel negative electrode 9, the following materials were used. A nickel-plated steel sheet was used as a material for the positive electrode terminal plate 1. Polyethylene was used as a material for the shrinkable tube 2. A formulation of 50 parts by weight of electrolytic manganese dioxide, 5 parts by weight of acetylene black, and 1 part by weight of an aqueous solution of potassium hydroxide having a concentration of 37 wt % was used as a material for the positive electrode agent 3. A nickel-plated steel sheet was used as a material for the outer can 4. Polyolefin was used as a material for the separator 5. A tin-plated brass-made rod was used as a material for the collector rod 6. A polyolefin-based resin was used as a material for the gasket 7. A nickel-plated steel sheet was used as a material for the negative electrode terminal plate 8. The model battery, thus formed, was connected to an external resistor of 2Ω at room temperature (20 to 25° C.) and was discharged continuously, so that the time until the voltage was lowered to 0.9 V was determined as the duration of the battery (hour). The same operation was carried out with respect to another model battery that was left to stand in a constant temperature vessel at 60° C. for 60 days after it was formed, and the duration of the battery was measured.

(Impact Resistance of Battery)

A model battery formed in the same manner as described above was dropped from a height of 1 m 10 times continuously while being connected with an external resistor of 2Ω at room temperature (20 to 25° C.) for continuous discharge. The voltage before this dropping operation and the voltage immediately after the foregoing operation were measured, and the impact resistance (%) was calculated by the following formula:

$$\text{Impact resistance (\%)} = \frac{[\text{Voltage (V) immediatly after dropping (10th time)}]}{[\text{Voltage (V) before dropping}]} \times 100$$

The same operation was carried out with respect to another model battery that was left to stand in a constant temperature vessel at 60° C. for 60 days after it was formed, and the impact resistance of the same was determined.

TABLE 1

|  |  | Gelling Agent | Viscosity (Pa·s) N1 | Viscosity (Pa·s) N60 | Viscosity Ratio N1/N60 | Content of Soluble Component (%) | Content of Swollen Particles (BA) (%) 32~1000 (μm) | Content of Swollen Particles (BA) (%) 45~850 (μm) |
|---|---|---|---|---|---|---|---|---|
| Example | 1 | (1) | 70 | 80 | 0.88 | 8 | 95 | 92 |
|  | 2 | (2) | 70 | 80 | 0.88 | 8 | 96 | 92 |
|  | 3 | (3) | 50 | 70 | 0.71 | 16 | 92 | 89 |
|  | 4 | (4) | 60 | 70 | 0.86 | 12 | 85 | 82 |
|  | 5 | (5) | 70 | 80 | 0.87 | 20 | 83 | 81 |
|  | 6 | (6) | 40 | 50 | 0.80 | 8 | 3 | 1 |
|  | 7 | (7) | 30 | 40 | 0.75 | 9 | 40 | 33 |
|  | 8 | (8) | 70 | 80 | 0.88 | 8 | 95 | 92 |
|  | 9 | (9) | 60 | 70 | 0.86 | 9 | 80 | 75 |
|  | 10 | (10) | 70 | 80 | 0.88 | 8 | 95 | 91 |
|  | 11 | (11) | 55 | 70 | 0.79 | 8 | 90 | 85 |
|  | 12 | (12) | 50 | 40 | 1.23 | 18 | 94 | 91 |
|  | 13 | (13) | 95 | 90 | 1.06 | 8 | 95 | 92 |
| Comparative Example | 1 | (H1) | 60 | 65 | 0.92 | — | 0 | 0 |
|  | 2 | (H2) | 80 | 90 | 0.89 | 70 | 1 | 1 |
|  | 3 | (H3) | 70 | 80 | 0.88 | 72 | 12 | 7 |
|  | 4 | (H4) | 60 | 30 | 2.00 | 95 | 4 | 2 |
|  | 5 | (H5) | 40 | 15 | 2.67 | 40 | 80 | 75 |
|  | 6 | (H6) | 20 | 30 | 0.67 | 3 | 98 | 95 |
|  | 7 | (H7) | 20 | 30 | 0.67 | 41 | 99 | 97 |
|  | 8 | (H8) | 40 | 10 | 4.00 | — | 0 | 0 |

TABLE 2

|  |  | Gelling Agent | Weight-Average Particle Diameter (μm) | Absorption Amount (g/g) | Content of Metal Elements (×10⁻⁴%) |
|---|---|---|---|---|---|
| Example | 1 | (1) | 350 | 35 | 1.9 |
|  | 2 | (2) | 350 | 35 | 1.8 |
|  | 3 | (3) | 350 | 40 | 1.8 |
|  | 4 | (4) | 380 | 37 | 0.8 |
|  | 5 | (5) | 340 | 30 | 2.2 |
|  | 6 | (6) | 700 | 35 | 1.9 |
|  | 7 | (7) | 20 | 33 | 1.8 |
|  | 8 | (8) | 350 | 35 | 1.9 |
|  | 9 | (9) | 350 | 33 | 53.4 |
|  | 10 | (10) | 350 | 35 | 1.8 |
|  | 11 | (11) | 350 | 33 | 1.8 |
|  | 12 | (12) | 350 | 38 | 1.9 |
|  | 13 | (13) | 350 | 31 | 1.8 |
| Comparative Example | 1 | (H1) | 100 | Dissolved | 7.6 |
|  | 2 | (H2) | 20 | Dissolved | 3.1 |
|  | 3 | (H3) | 450 | Dissolved | 4.3 |
|  | 4 | (H4) | 350 | Dissolved | 1.9 |
|  | 5 | (H5) | 350 | 22 | 1.9 |
|  | 6 | (H6) | 350 | 15 | 1.8 |
|  | 7 | (H7) | 350 | 12 | 1.7 |
|  | 8 | (H8) | 350 | Dissolved | 1.6 |

TABLE 3

| | | Gelling Agent | Sedimentation Property of Zinc Powder (mm) | Injection Time (Sec) | Variability of Injection Amount σ | Amount of Hydrogen Gas Generated (ppm) |
|---|---|---|---|---|---|---|
| Example | 1 | (1) | 1 | 0.1 | 0.02 | 500> |
| | 2 | (2) | 1 | 0.1 | 0.02 | 500> |
| | 3 | (3) | 2.5 | 0.2 | 0.04 | 500> |
| | 4 | (4) | 2 | 0.2 | 0.03 | 500> |
| | 5 | (5) | 2.5 | 0.4 | 0.04 | 500> |
| | 6 | (6) | 12 | Clogged | — | 500> |
| | 7 | (7) | 25 | 0.5 | 0.10 | 500> |
| | 8 | (8) | 8 | 0.6 | 0.11 | 500> |
| | 9 | (9) | 10 | 0.3 | 0.06 | 2200 |
| | 10 | (10) | 9 | 0.5 | 0.08 | 500> |
| | 11 | (11) | 12 | 0.5 | 0.17 | 500> |
| | 12 | (12) | 5 | 0.3 | 0.09 | 500> |
| | 13 | (13) | 3 | 0.4 | 0.10 | 500> |
| Comparative Example | 1 | (H1) | 50 | 4.2 | 0.24 | 500> |
| | 2 | (H2) | 44 | 4.5 | 0.18 | 500> |
| | 3 | (H3) | 42 | 4.0 | 0.22 | 500> |
| | 4 | (H4) | 38 | 5.3 | 0.26 | 500> |
| | 5 | (H5) | 22 | 4.2 | 0.24 | 500> |
| | 6 | (H6) | 20 | 1.5 | 0.15 | 500> |
| | 7 | (H7) | 19 | 2.8 | 0.18 | 500> |
| | 8 | (H8) | 51 | 6.5 | 0.32 | 500> |

TABLE 4

| | | Gelling Agent | Duration (hour) | | Impact Resistance (%) | |
|---|---|---|---|---|---|---|
| | | | Immediately After Production | After Sixty-Day Storage | Immediately After Production | After Sixty-Day Storage |
| Example | 1 | (1) | 20.4 | 19.2 | 97 | 96 |
| | 2 | (2) | 19.3 | 18.2 | 97 | 96 |
| | 3 | (3) | 20.3 | 19.5 | 96 | 94 |
| | 4 | (4) | 19.2 | 19.0 | 95 | 94 |
| | 5 | (5) | 20.7 | 19.5 | 93 | 91 |
| | 6 | (6) | 19.1 | 18.4 | 80 | 78 |
| | 7 | (7) | 18.8 | 17.5 | 75 | 72 |
| | 8 | (8) | 18.4 | 16.9 | 85 | 83 |
| | 9 | (9) | 19.1 | 17.7 | 65 | 62 |
| | 10 | (10) | 19.3 | 17.0 | 87 | 85 |
| | 11 | (11) | 18.9 | 17.3 | 83 | 81 |
| | 12 | (12) | 19.8 | 18.9 | 90 | 89 |
| | 13 | (13) | 20.1 | 19.1 | 93 | 92 |
| Comparative Example | 1 | (H1) | 12.3 | 10.8 | 15 | 8 |
| | 2 | (H2) | 18.6 | 12.2 | 33 | 27 |
| | 3 | (H3) | 17.5 | 11.8 | 37 | 30 |
| | 4 | (H4) | 19.2 | 17.5 | 35 | 30 |
| | 5 | (H5) | 18.7 | 17.5 | 53 | 47 |
| | 6 | (H6) | 15.7 | 10.8 | 50 | 45 |
| | 7 | (H7) | 14.9 | 10.5 | 37 | 33 |
| | 8 | (H8) | 16.8 | 13.6 | 30 | 22 |

It should be noted that in Example 6 of Table 3, the syringe used for injection was slogged, but in the case where a syringe having an inlet with an internal diameter of 5 mm was used, no problem occurred to the injection.

INDUSTRIAL APPLICABILITY

The gelling agent of the present invention is useful, not only as a gelling agent for cylindrical alkaline batteries, but also as a gelling agent for primary and secondary alkaline batteries such as alkaline button batteries, silver oxide batteries, nickel-cadmium storage batteries, and nickel metal hydride storage batteries. Further, an alkaline battery in which the gelling agent of the present invention is used is useful as an alkaline battery that exhibits excellent impact resistance and excellent retention of discharge characteristics.

The invention claimed is:

1. A gelling agent for use in an alkaline battery, the gelling agent comprising a cross-linked polymer (A) formed with a (meth)acrylic acid (salt) as a principal constituent monomer unit,
    wherein the gelling agent allows an obtained gel (GA) to have a viscosity ratio (N1/N60), determined as follows, of 0.7 to 1.3, and includes components soluble in 37 wt % aqueous solution of potassium hydroxide that account for 30 wt % or less of the gelling agent:
    the viscosity ratio (N1/N60) of the gel (GA) is determined by preparing the gel (GA) by stirring 100 parts by weight of 37 wt % aqueous solution of potassium hydroxide, 2 parts by weight of the cross-linked polymer (A), and 200 parts by weight of zinc powder at 40° C. so as to be mixed uniformly, and measuring a viscosity (40° C., N1) of the gel (GA) after being left to stand at the same temperature for one day, and a viscosity (40° C., N60) of the gel (GA) after being left to stand at the same temperature for sixty days, according to JIS K7117-1: 1999, and
    wherein the cross-linked polymer (A) includes a cross-linking agent (b) unit that is decomposed by hydrolysis in an alkaline environment, and a cross-linking agent (c) unit that is not decomposed by hydrolysis in an alkaline environment.

2. The gelling agent according to claim 1, wherein the viscosity (40° C, N1) of the gel (GA) is 30 to 300 Pa·s.

3. The gelling agent according to claim 1, wherein the cross-linked polymer (A) satisfies the following requirement:
    among swollen particles (BA) obtained by uniformly mixing 2 parts by weight of the cross-linked polymer (A) and 300 parts by weight of 37 wt % aqueous solution of potassium hydroxide at 25° C., swollen particles having particle diameters of 32 to 1,000 μm account for at least 80 wt % of an entire weight of the swollen particles (BA).

4. The gelling agent according to claim 1, wherein an absorption amount of the cross-linked polymer (A) determined by the tea bag method after one-hour immersion in 37 wt % aqueous solution of potassium hydroxide is 20 to 60 g/g.

5. The gelling agent according to claim 1, wherein a weight ratio (b/c) between the cross-linking agent (b) unit and the cross-linking agent (c) unit contained in the cross-linked polymer (A) is 0.4 to 2.5.

6. The gelling agent according to claim 1, wherein the cross-linking agent (b) is a compound including an ester bond and/or an amide bond, or a compound that is capable of forming an ester bond and/or an amide bond.

7. The gelling agent according to claim 1, wherein the cross-linking agent (c) bus 3 to 10 allyl groups and 1 to 5 hydroxyl groups.

8. The gelling agent according to claim 1, wherein a content of a metal element having an ionization tendency lower than that of zinc is not more than $15 \times 10^{-4}$ wt %.

9. A gelling agent for use in an alkaline battery, die gelling agent swelling with water, and comprising a cross-linked polymer (A) formed with a (meth)acrylic acid (salt) as a principal constituent monomer unit, wherein the gelling agent is obtained by aqueous solution polymerization or reversed-phase suspension polymerization in which a cross-linking agent (b) that is decomposable in an alkaline environment and an allyl ether-type cross-linking agent (c) having 2 to 10 allyl groups are used in combination, wherein each amount of the cross-linking agents (b) and (c) is in a range of 0.05 to 3 % on the basis of a weight of the (meth)acrylic acid (salt), and the gelling agent satisfies the following requirements (1) and (2):

(1) when the gelling agent is swollen in an aqueous solution of potassium hydroxide having a concentration of 37 wt %, swollen particles having particle diameters of 32 to 1,000 μm account for 80 wt % or more; and (2) an absorption amount determined by tea bag method after one-hour immersion in an aqueous solution of potassium hydroxide having a concentration of 37 wt % is 20 to 60 g/g.

10. An alkaline battery including the gelling agent according to claim 1 and zinc powder.

11. An alkaline battery including the gelling agent according to claim 9 and zinc powder.

* * * * *